(12) United States Patent
Belpanno

(10) Patent No.: US 7,036,991 B2
(45) Date of Patent: May 2, 2006

(54) HIGH-PRECISION SPINDLE ASSEMBLY FOR A DAVENPORT AUTOMATIC SCREW MACHINE

(75) Inventor: Sandro G. Belpanno, Rochester, NY (US)

(73) Assignee: Davenport Machine, Inc., Rochester, NJ (US)

( * ) Notice: Subject to any disclaimer, the term of this patent is extended or adjusted under 35 U.S.C. 154(b) by 72 days.

(21) Appl. No.: 10/894,883

(22) Filed: Jul. 20, 2004

(65) Prior Publication Data

US 2006/0018580 A1  Jan. 26, 2006

(51) Int. Cl.
*F16C 19/10* (2006.01)

(52) U.S. Cl. .................................. 384/606; 384/613

(58) Field of Classification Search ............... 384/517, 384/606, 613, 620, 322, 607
See application file for complete search history.

(56) References Cited

U.S. PATENT DOCUMENTS 3,947,078 A * 3/1976 Olsaker ..................... 384/620
5,205,376 A * 4/1993 Nowak ....................... 384/322

* cited by examiner

*Primary Examiner*—Lenard A. Footland
(74) *Attorney, Agent, or Firm*—Phillips Lytle LLP

(57) ABSTRACT

A spindle assembly (20) adapted to be mounted on the rotatable head (21) of a Davenport® multi-spindle automatic screw machine, broadly includes a one-piece outer spindle (38), a seal member (39), a front bearing assembly (40A, 40B, 40C), a front bearing retainer nut (41) forming with the seal member a tortuous passageway (85), a two-part spacer (37), a rear bearing assembly (44A, 44B), and a rear bearing retainer nut (45).

19 Claims, 5 Drawing Sheets

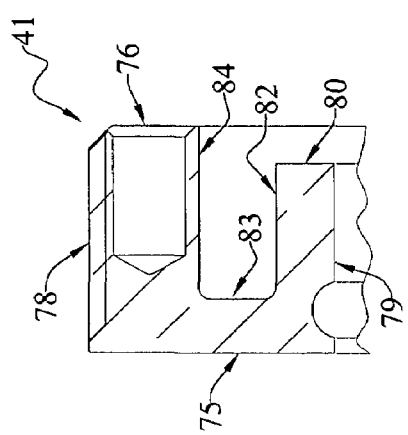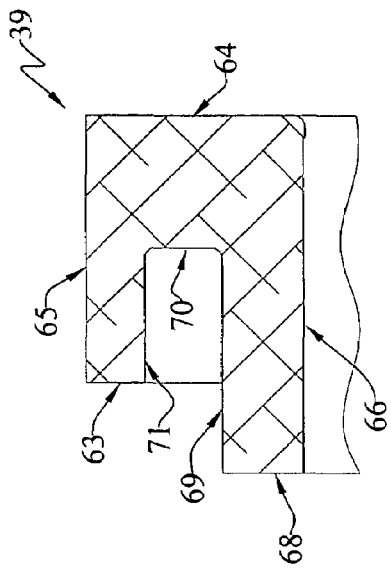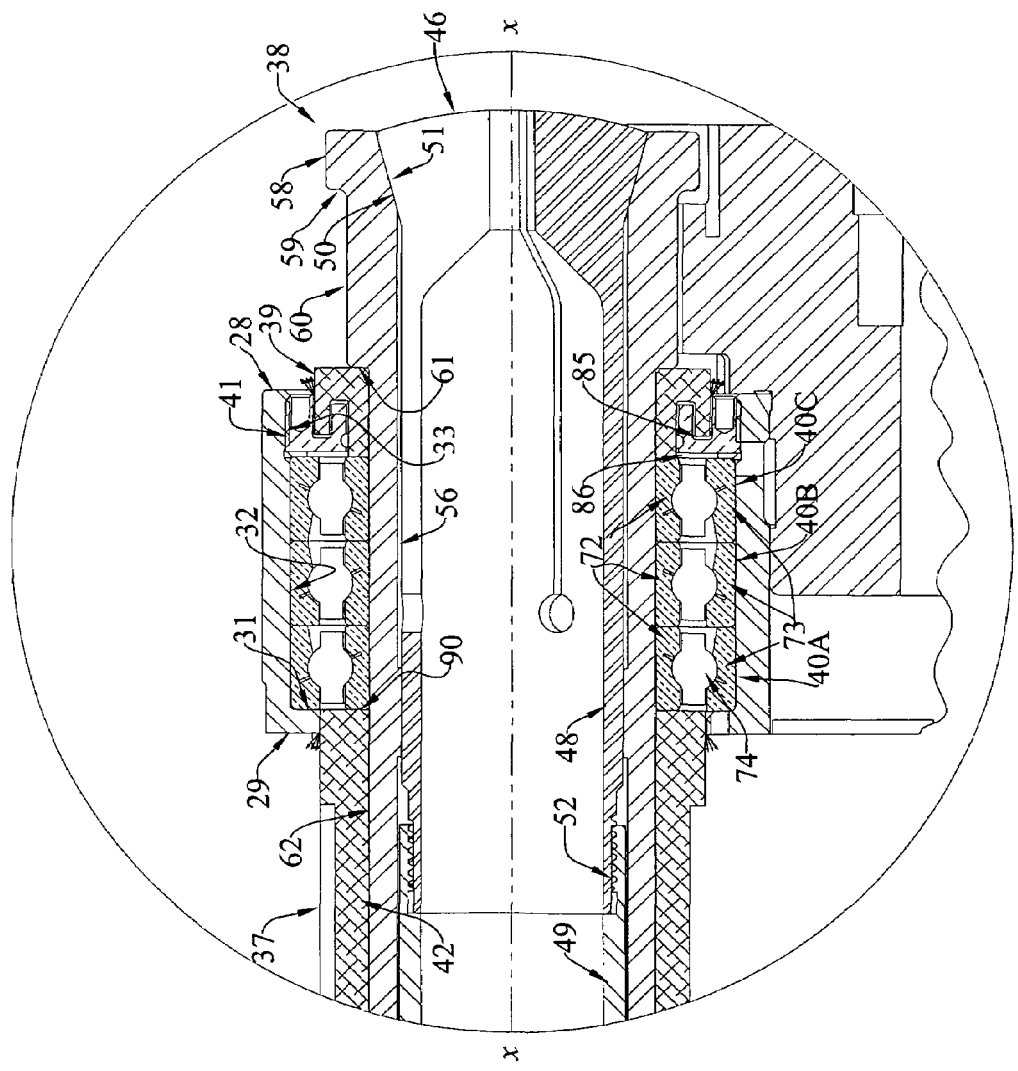

HIGH-PRECISION SPINDLE ASSEMBLY FOR A DAVENPORT AUTOMATIC SCREW MACHINE

TECHNICAL FIELD

The present invention relates generally to automatic screw machines, and, more particularly, to an improved high-precision spindle assembly that is adapted to be mounted on the rotatable head of a Davenport® multi-spindle automatic screw machine.

BACKGROUND ART

An automatic screw machine is a device in which a spindle is arranged to releasably hold a workpiece, and to rotate the workpiece relative to a tool. A Davenport® multi-spindle automatic screw machine has a rotating head with five such spindles arranged therein. (Davenport® is a registered trademark of Davenport Industries, Inc., now Davenport Machine, Inc., 167 Ames Street, Rochester, N.Y. 14611.) The head may be selectively rotated about its axis of elongation to angularly index the five spindles to various positions relative to various tools. When the head is in a particular angular position, each spindle therein is arranged in a particular station. As indicated above, the spindles are arranged to rotate relative to the head such that machining operations may be performed on the workpiece at the various stations.

These Davenport® multi-spindle automatic screw machines have existed in the prior art for many years. They are of a particularly durable and adaptable design, and have been improved and updated from time-to-time. Many of these devices are still in use today.

From time-to-time, it becomes necessary to replace the spindle assemblies on such Davenport® screw machines. Examples of prior art spindles are shown and described in U.S. Pat. No. 4,014,558, and in pending U.S. patent application Ser. No. 10/411,888, the aggregate disclosures of both of which are hereby incorporated by reference.

The present invention has largely evolved from a quest for greater accuracy. Indeed, with the inventive spindle disclosed herein, the target accuracy may be on the order of about 0.0003–0.0005 inches, as compared to a target accuracy of about 0.003 inches with prior art embodiments. Thus, the improved spindle affords an order of magnitude of improvement in precision and accuracy. Moreover, the improved spindle has a greater longevity. It wears better, is stiffer, allows greater rotational speeds, allows more aggressive machining cuts in the workpiece, and affords the capability of improved heat dissipation and lubrication.

DISCLOSURE OF THE INVENTION

With parenthetical reference to the various parts, portions and surfaces of the disclosed embodiment, merely for purposes of illustration and not by way of limitation, the present invention broadly provides an improved spindle assembly (20) that is adapted to be mounted on the rotating head (21) of a Davenport® multi-spindle automatic screw machine.

The improved head has a forwardly-facing abutment surface (31).

In one aspect, the improvement broadly includes: a one-piece outer spindle (38) having a front end (46), a rear end (54), and a rearwardly-facing abutment surface (61) adjacent the front end; a seal member (39) surrounding the outer spindle, the seal member having a front end (64) arranged to bear against the outer spindle abutment surface (61) and having a rear end (63); at least one front bearing (40A, 40B, 40C) surrounding the outer spindle, the front bearing having an inner race (72) and an outer race (73), the front end of the front bearing inner race being arranged to bear against the rear end of the seal member, the rear end of the front bearing outer race being arranged to bear against the head abutment surface, the outer race of the front bearing being arranged to radially engage one portion of the rotating head of the screw machine; a front bearing retainer nut (41) matingly engaging the head and having a rear end to bear against the front end of the front bearing outer race; a spacer (37) surrounding an intermediate portion of the outer spindle, the spacer having a front end (90) adapted to bear against the rear end of the front bearing inner race, and having a rear end (95); at least one rear bearing (44A, 44B) surrounding the outer spindle, the rear bearing having an inner race (96) and an outer race (98), the front end of the rear bearing inner race being arranged to bear against the rear end of the spacer, the outer race of the rear bearing being arranged to radially engage another portion of the head; and a rear bearing retainer nut (45) matingly engaging the outer spindle and arranged to bear against the rear end of the rear bearing.

In another aspect, the head has a rearwardly-facing abutment surface, and the improvement broadly includes: a one-piece outer spindle (38) having a front end (46), a rear end (54), and a rearwardly-facing abutment surface (61) adjacent the front end; a seal member (39) surrounding the outer spindle, the seal member having a front end (64) arranged to bear against the outer spindle abutment surface (61) and having a rear end (63); at least one front bearing (40A, 40B, 40C) surrounding the outer spindle, the front bearing having an inner race (72) and an outer race (73), the front end of the front bearing inner race being arranged to bear against the rear end of the seal member, the front end of the front bearing outer race being arranged to bear against the head abutment surface, the outer race of the front bearing being arranged to radially engage one portion of the rotating head of the screw machine; a front bearing retainer nut (41) matingly engaging the head and having a rear end to bear against the front end of the front bearing outer race; a spacer (37) surrounding an intermediate portion of the outer spindle, the spacer having a front end (90) adapted to bear against the rear end of the front bearing inner race, and having a rear end (95); at least one rear bearing (44A, 44B) surrounding the outer spindle, the rear bearing having an inner race (96) and an outer race (98), the front end of the rear bearing inner race being arranged to bear against the rear end of the spacer, the outer race of the rear bearing being arranged to radially engage another portion of the head; and a rear bearing retainer nut (45) matingly engaging the outer spindle and arranged to bear against the rear end of the rear bearing.

In the preferred embodiment, the front bearing retainer nut forms with the seal member a tortuous passageway (85) through which fluid may flow from the front bearing to the atmosphere.

There may be multiple front bearings and multiple rear bearings, such as angular-contact ball bearings. Each bearing is typically adapted to resist both axial and rotative loads.

A flow of fluid lubricant, such as an air/oil mixture, may be supplied to the front bearing. A majority of this flow may exit the front bearing rearwardly, and a majority amount may exit the front bearing rearwardly, and a minority amount of such flow may exit the front bearing forwardly. In one particularly preferred form, the tortuous passageway is so configured and arranged that approximately 20% of such flow of fluid lubricant exits the front bearing forwardly by passing through the tortuous passageway, and about 80% of such flow exits the front bearing rearwardly by passing between the spacer and the head. While the fluid lubricant may be an air/oil mixture, other types of fluid lubricants and mixtures may be employed.

In the preferred form, a flow of fluid lubricant is supplied to the rear bearing, and a majority amount of such flow exits the rear bearing in a forward direction, and a minority amount of such flow exits the rear bearing in a rearward direction. In the preferred embodiment, about 20% of such flow exits from the rear bearing in a rearward direction, and about 80% of such flow exits from the rear bearing in a forward direction. Here again, the lubricant may be an air/oil mixture, or other fluid lubricants may be substituted therefor.

The spindle assembly has a target accuracy on the order of about 0.0003–0.0005 inches. A gear may surround and engage a portion of the spacer, for selectively rotating the spindle relative to the head. The spacer may have a front part and a rear part.

Accordingly, the general object of the invention is to provide an improved spindle assembly that is adapted to be mounted on the rotatable head of a Davenport® multi-spindle automatic screw machine.

Another object is to provide an improved high-precision head assembly for use on such a Davenport® multi-spindle automatic screw machine.

Still another object is to provide an improved high-precision spindle assembly for a Davenport® multi-spindle automatic screw machine, which spindle exhibits the desirable properties of improved longevity, greater stiffness, rotation of the workpiece at greater angular speeds, that utilizes an air/oil mixture for improved heat dissipation and lubrication, and that allows more aggressive cuts to be made in the workpiece.

These and other objects and advantages will become apparent from the foregoing and ongoing written specification, the drawings, and the appended claims.

BRIEF DESCRIPTION OF THE DRAWINGS

FIG. 4 is a further-enlarged fragmentary view of a forward portion of the improved spindle assembly shown in FIG. 3.

FIG. 4A is a still further enlarged fragmentary view of the seal member shown in FIG. 4.

FIG. 4B is a still further enlarged fragmentary view of the front bearing retainer nut shown in FIG. 4.

DESCRIPTION OF THE PREFERRED EMBODIMENTS

Figures 1, 2:
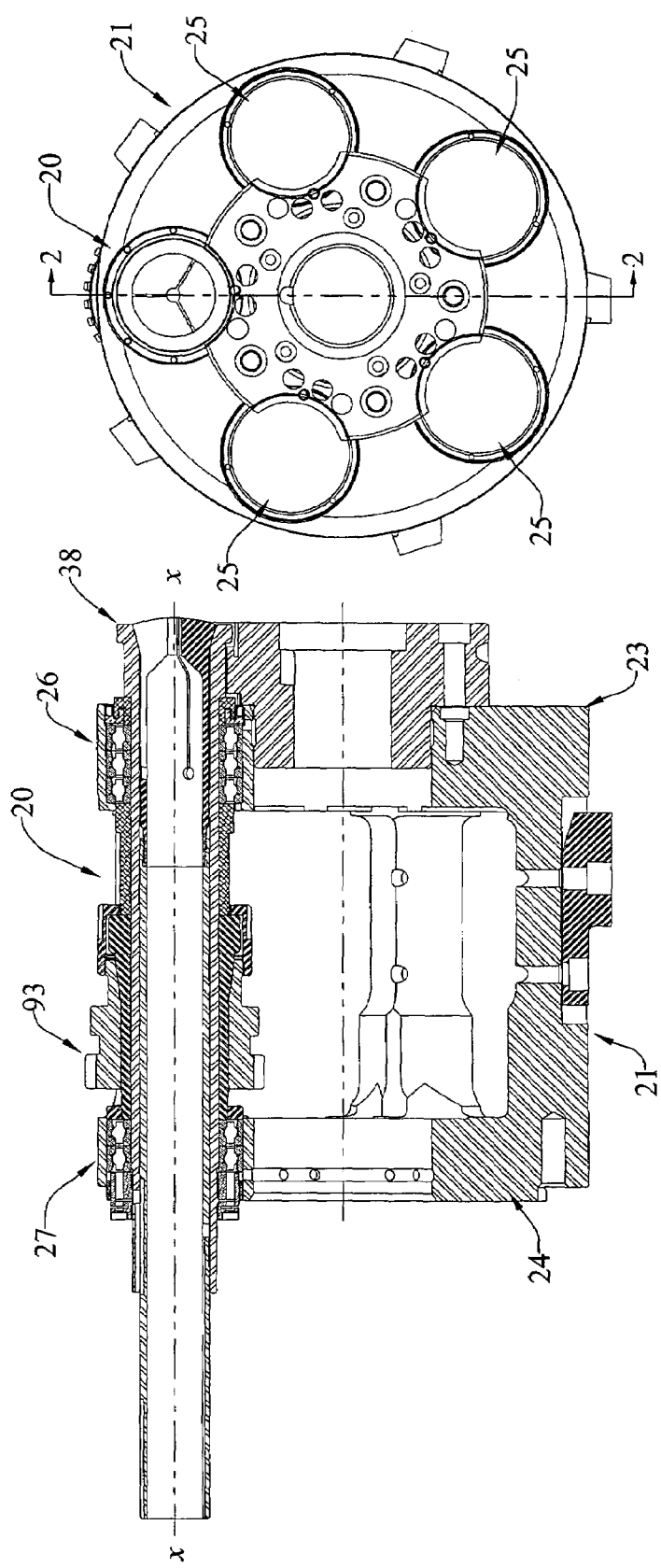
FIG. 1 is a front elevation of a rotatable head that is adapted to be utilized in a Davenport® multi-spindle automatic screw machine, this view showing five circumferentially-spaced stations in which spindles may be mounted, with one spindle being physically located in the station at the 12:00 o'clock position.
FIG. 2 is a fragmentary longitudinal sectional view thereof, taken generally on line 2—2 of FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1 and 2 thereof, the present invention broadly provides an improved high-precision spindle assembly, generally indicated at 20, that is adapted to be mounted on the rotatable head 21 of a Davenport® multi-spindle automatic screw machine (not fully shown). In FIG. 2, head 21 is shown as having a front plate 23 and a rear plate 24. The spindle is elongated along horizontal axis x—x. A plurality of tubes extend horizontally through the head to accommodate a corresponding plurality of spindle assemblies, such as indicated at 20. In FIG. 1, there are five such tubes, and these are shown as being arranged at equal interval angles of about 72°. In FIG. 1, an improved spindle 20 is shown as being in the tube that is arranged at the 12:00 o'clock position, but the other openings, severally indicated at 25, are shown as being vacant.

Figure 3:
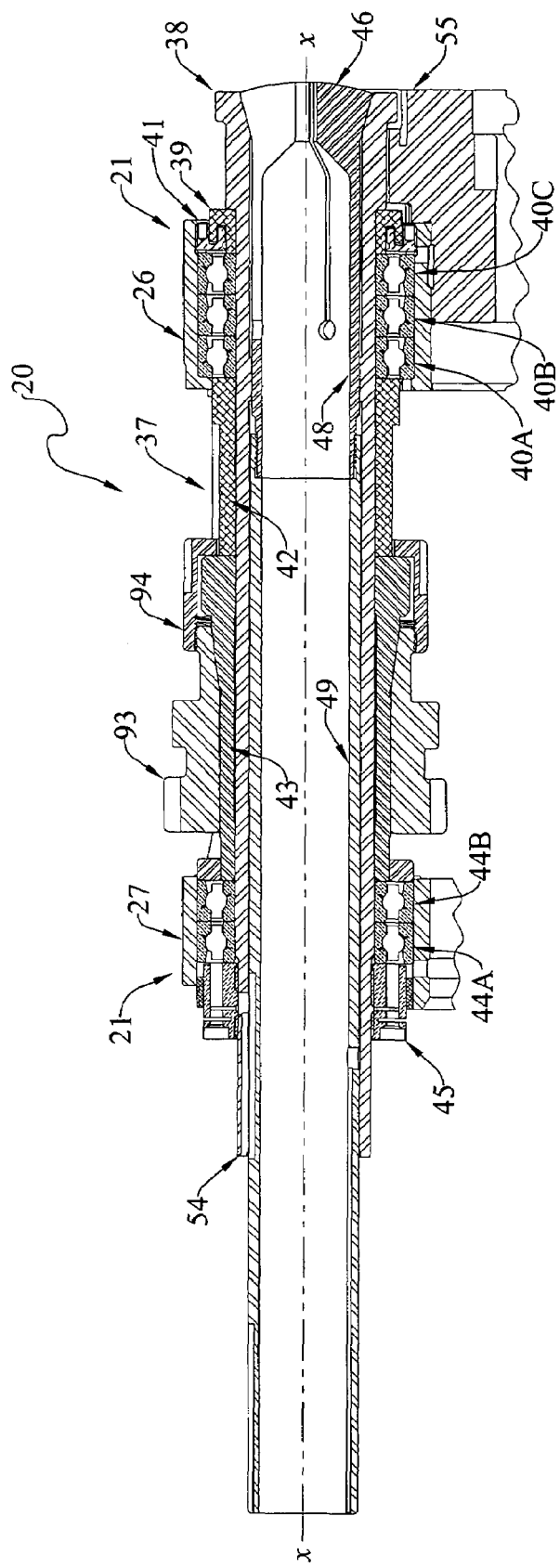
FIG. 3 is an enlarged fragmentary longitudinal vertical sectional view of the improved spindle assembly shown in FIG. 2.
Figure 5:
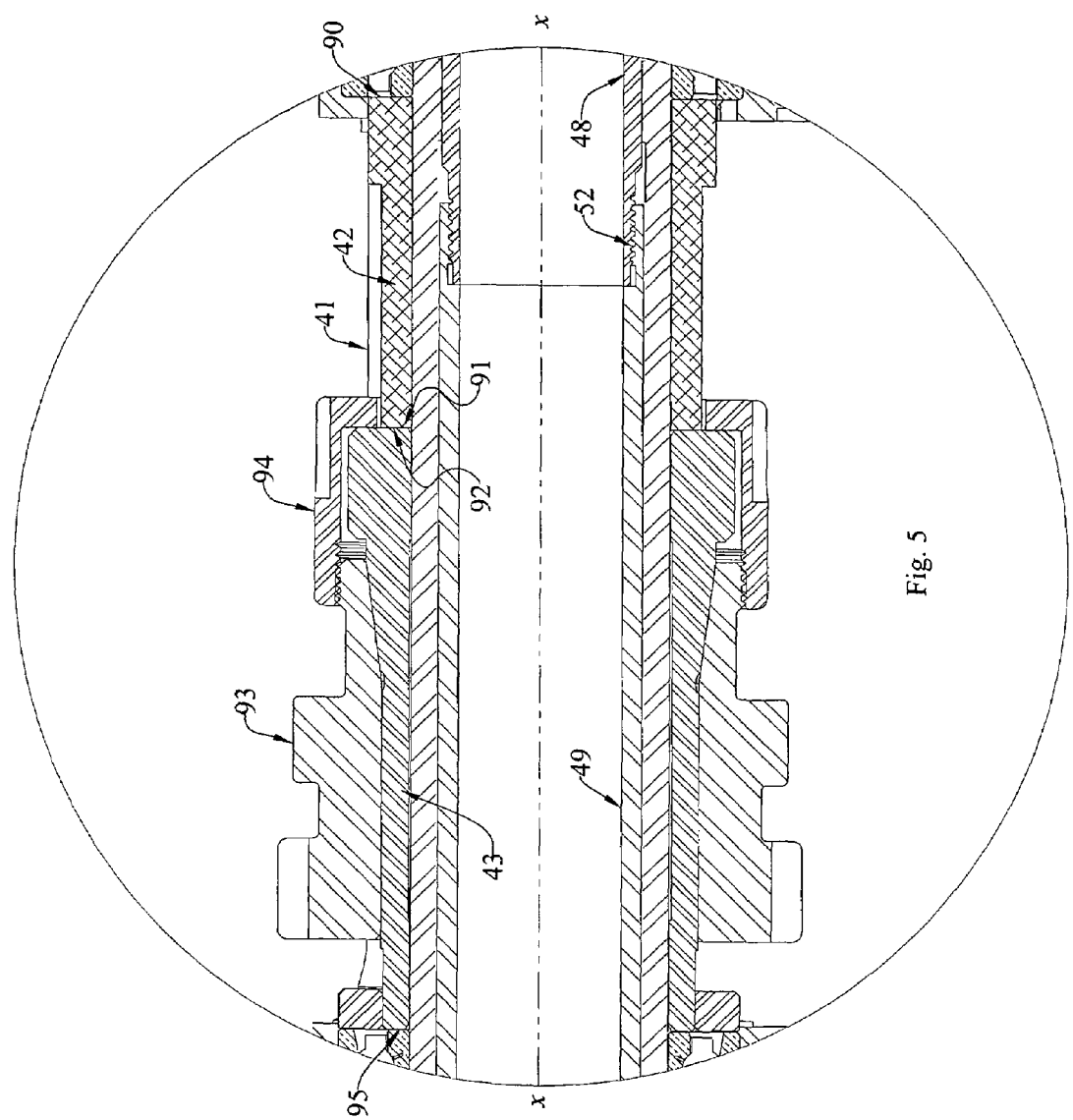
FIG. 5 is a further-enlarged fragmentary view of a central portion of the improved spindle assembly shown in FIG. 3.

Referring now principally to FIG. 3, head 21 is shown as having, in pertinent part, a forward portion 26 and a rearward portion 27. As best shown in FIG. 4, the forward portion is shown as having, in pertinent part, an annular vertical right face 28, an annular vertical left face 29, an inner surface that sequentially includes (from left-to-right in FIG. 4) an inwardly-facing horizontal cylindrical surface 30 extending rightwardly from the inner margin of left end face 29, a rightwardly-facing annular vertical surface 31 extending radially outwardly therefrom, an inwardly-facing horizontal cylindrical surface 32, and an internally-threaded portion 33 continuing rightwardly therefrom to join the inner margin of right end face 28. Head surface 31 constitutes a forwardly-facing abutment surface on the head.

Figure 6:
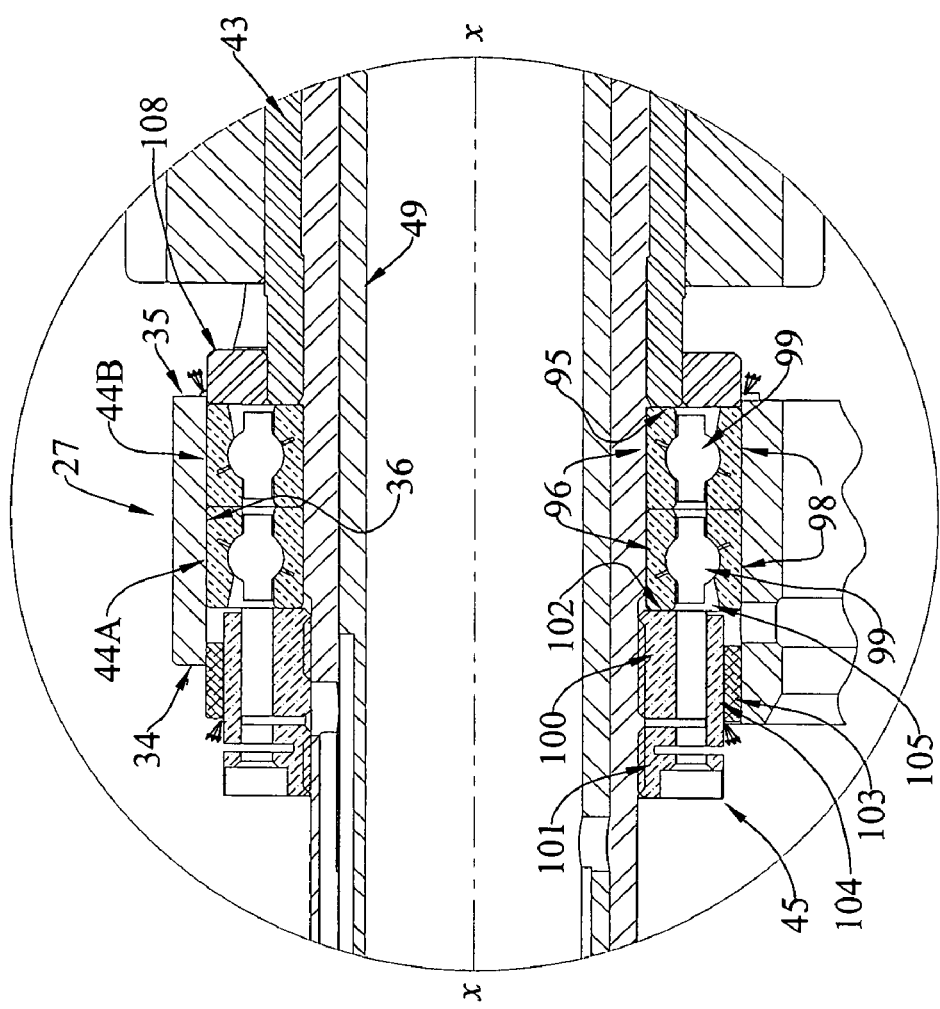
FIG. 6 is a further-enlarged fragmentary view of a rearward portion of the improved spindle assembly shown in FIG. 3.

As best shown in FIG. 6, the head rear portion 27 includes an annular vertical left end face 34, an annular vertical right end face 35, and an inwardly-facing horizontal cylindrical surface 36 extending between the inner margins of left and right end faces 34, 35, respectively.

Referring now to FIG. 3, the improved spindle assembly is shown as broadly including a one-piece outer spindle 38, a seal member 39, three axially-stacked front bearings, severally indicated at 40 and individually identified by the suffixes "A", "B" and "C", respectively, a front bearing nut 41, a spacer 37 including a front part 42 and a rear part 43, two rear bearings, severally indicated at 44 and individually identified by the suffix letters "A" and "B", respectively, and a rear bearing retainer nut 45 matingly engaging the outer spindle and arranged to bear against the rear end of the bearing.

A two-piece inner spindle, generally indicated at 46, is slidably mounted within the outer spindle. This inner spindle is shown as having a forward portion 48 and a rearward portion 49. The forward portion forms a three-fingered collet, and has an outwardly-facing frusto-conical surface 50 arranged to engage an inwardly- and rightwardly-facing frusto-conical surface 51 on the outer spindle. The inner spindle forward and rearward portions are matingly joined by a threaded connection, as indicated at 52.

The inner spindle is adapted to be moved axially within the outer spindle. As the inner spindle is moved rearwardly relative to the outer spindle, facing frusto-conical surfaces 50, 51 will engage one another, to move the forward or free ends of the collet fingers radially inwardly to grip a workpiece therebetween. Conversely, if the inner spindle is moved rightwardly relative to the outer spindle, the collet fingers will be permitted to expand radially outwardly, thereby to release a workpiece captured therebetween.

The outer spindle 38 is shown as being a horizontally-elongated tubular member having an annular vertical left end face 54, an annular vertical right end face 55, and an inwardly-facing horizontal cylindrical surface 56 extending leftwardly from the left margin of frusto-conical surface 51. The outer tube also has (from right-to-left in FIG. 4), an outwardly-facing horizontal cylindrical surface 58 extending leftwardly from the outer margin of right end face 55, a leftwardly-facing annular vertical surface 59, an outwardly-facing horizontal cylindrical surface 60, a leftwardly-facing annular vertical surface 61, and an outwardly-facing horizontal cylindrical surface 62 continuing leftwardly therefrom, an externally-threaded portion, and an outwardly-facing horizontal cylindrical surface continuing leftwardly therefrom to join rear end face 54. Surface 61 constitutes a rearwardly-facing abutment surface on the outer spindle adjacent its rightward front end.

As best shown in FIG. 4A, seal member 39 is shown as being a specially-configured annular member having a leftwardly-facing annular vertical left end face 63, an annular vertical right end face 64, an inwardly-facing horizontal cylindrical surface 65 adapted to surround a portion of the outer tube, and an outer surface that sequentially includes an outwardly-facing horizontal cylindrical surface 66 extending leftwardly from the outer margin of right end face 64, a leftwardly-facing annular vertical surface 68, an inwardly-facing horizontal cylindrical surface 69, a leftwardly-facing annular vertical surface 70, and an outwardly-facing horizontal cylindrical surface 71 continuing leftwardly therefrom to join the outer margin of left end face 63. The front end face 64 of the seal member is arranged to bear against outer spindle abutment surface 61.

As previously mentioned, the improved spindle includes three front bearings. These bearings are arranged so as to be axially adjacent one another. Each bearing is generally indicated at 40, with the individual bearings being identified by the suffixes "A", "B" and "C", respectively. Each bearing is shown as having an inner race 72, an outer race 73, and a ball 74 therebetween. The front end of front bearing inner race 72C is arranged to bear against the rear end 63 of the seal member. The rear end of front bearing outer race 73A is arranged to bear against head abutment surface 31. The outer races of each of the front bearings is arranged to radially engage the forward portion 25 of the head.

The front-bearing retainer nut 41 is shown as being a specially-configured ring-like member having an annular vertical left end face 75, an annular vertical right end face 76, and an externally-threaded outer surface 78 extending therebetween. The retainer nut also includes an additional specially-configured surface that sequentially includes an inwardly-facing horizontal cylindrical surface 79 extending rightwardly from the inner margin of left end face 75, and a rightwardly-facing annular vertical surface 80, an outwardly-facing horizontal cylindrical surface 82 extending leftwardly therefrom, a rightwardly-facing annular vertical surface 83, and an inwardly-facing horizontal cylindrical surface 84 continuing rightwardly therefrom to join the inner margin of right end face 76. The front bearing retainer nut is matingly engaged with the head, and forms a tortuous S-shaped passageway 85 that communicates the space between the bearings with the ambient atmosphere. In the preferred embodiment, an air/oil mixture is admitted to the space 86 between the front right bearing 40C and the seal and the bearing retainer. From this space, the air/oil mixture will circulate through the bearings and be discharged. The majority of such air/oil mixture is discharged leftwardly between the spacer 42 and head surface 30. A minor amount of such lubricant traverses the tortuous passageway and is discharged between the facing surfaces forming tortuous passageway 85. In the preferred embodiment, approximately 80% of such fluid lubricant flow passes rearwardly between head surface 30 and the spacer, and a minor amount, say 20%, flows through the tortuous passageway and is discharged between the seal member and retainer nut.

As indicated above, the spacer 37 is shown as including a front spacer part 42 and a rear spacer part 43. These are arranged in axially-abutting relation to one another. More particularly, the right end face 90 of spacer right part 42 bears against the inner race of front bearing 40A. The right end 91 of rear spacer 43 bears against the left end 92 of front spacer part 42. If desired, an aligning gear assembly, generally indicated at 93, may be held to the spacer rear part by means of a nut 94.

The spacer rear part 43 is shown is having a rearwardly-facing annular vertical left rear end surface 95. Rear bearings 44A and 44B are shown as having inner races 96, outer races 98 and intermediate balls 99. The rear end face 95 of spacer rear part 43 bears against the inner race of bearing 44B. The outer races of both rear bearings 44A, 44B engage the outer encircling surface 36 of the head.

Rear bearing retainer nut 45 is shown as being a specially-configured member having a forward portion 100 and a rearward portion 101. Both portions are matingly engaged with threaded portions on the outer spindle. The rear bearing nut has an undulating cross-sectional shape or configuration. The annular vertical right end face 102 of forward portion 100 bears against the inner race of bearing 44A. A ring-like plug or chip seal 103 is operatively arranged between the outer surface 104 of the rear bearing retainer nut and the inwardly-facing surface 36 of the head.

An air/oil mixture is supplied to chamber 105. From this chamber, the air/oil mixture may flow to lubricate both rear bearings, and may be discharged through the space between a spacer 108 and head surface 36. Another portion of this lubricant may be discharged between the rear retainer nut and spacer 103. In the preferred embodiment, a majority of the lubricant flows forwardly, and a minor portion flows rearwardly. In the preferred embodiment, approximately 80% of the lubricant flow is directed forwardly, while the remaining 20% is directed rearwardly.

The device is assembled as shown. It has been applicant's experience that the provision of a unitary or one-piece outer spindle, in combination with the other structure, affords the capability of substantially increased precision, being on one order of magnitude greater than that heretofore obtained.

Therefore, the present invention broadly provides an improved spindle assembly (20) that is adapted to be mounted on the rotating head (21) of a Davenport® multi-spindle automatic screw machine.

In one aspect, the improved head has a forwardly-facing abutment surface (31), and the improvement broadly includes: a one-piece outer spindle (38) having a front end (46), a rear end (54), and a rearwardly-facing abutment surface (61) adjacent the front end; a seal member (39) surrounding the outer spindle, the seal member having a front end (64) arranged to bear against the outer spindle abutment surface (61) and having a rear end (63); at least one front bearing (40A, 40B, 40C) surrounding the outer spindle, the front bearing having an inner race (72) and an outer race (73), the front end of the front bearing inner race being arranged to bear against the rear end of the seal member, the rear end of the front bearing outer race being arranged to bear against the head abutment surface, the outer race of the front bearing being arranged to radially engage one portion of the rotating head of the screw machine; a front bearing retainer nut (41) matingly engaging the head and having a rear end to bear against the front end of the front bearing outer race, the front bearing retainer nut forming with the seal member a tortuous passageway (85) through which fluid may flow from the front bearing to the atmosphere; a spacer (37) surrounding an intermediate portion of the outer spindle, the spacer having a front end (90) adapted to bear against the front end of the front bearing inner race, and having a rear end (95); at least one rear bearing (44A, 44B) surrounding the outer spindle, the rear bearing having an inner race (96) and an outer race (98), the front end of the rear bearing inner race being arranged to bear against the rear end of the spacer, the outer race of the rear bearing being arranged to radially engage another portion of the head; and a rear bearing retainer nut (45) matingly engaging the outer spindle and arranged to bear against the rear end of the rear bearing.

In another aspect, the head has a rearwardly-facing abutment surface, and the improvement broadly includes: a one-piece outer spindle (38) having a front end (46), a rear end (54), and a rearwardly-facing abutment surface (61) adjacent the front end; a seal member (39) surrounding the outer spindle, the seal member having a front end (64) arranged to bear against the outer spindle abutment surface (61) and having a rear end (63); at least one front bearing (40A, 40B, 40C) surrounding the outer spindle, the front bearing having an inner race (72) and an outer race (73), the front end of the front bearing inner race being arranged to bear against the rear end of the seal member, the front end of the front bearing outer race being arranged to bear against the head abutment surface, the outer race of the front bearing being arranged to radially engage one portion of the rotating head of the screw machine; a front bearing retainer nut (41) matingly engaging the head and having a rear end to bear against the front end of the front bearing outer race; a spacer (37) surrounding an intermediate portion of the outer spindle, the spacer having a front end (90) adapted to bear against the rear end of the front bearing inner race, and having a rear end (95); at least one rear bearing (44A, 44B) surrounding the outer spindle, the rear bearing having an inner race (96) and an outer race (98), the front end of the rear bearing inner race being arranged to bear against the rear end of the spacer, the outer race of the rear bearing being arranged to radially engage another portion of the head; and a rear bearing retainer nut (45) matingly engaging the outer spindle and arranged to bear against the rear end of the rear bearing.

MODIFICATIONS

The present invention broadly contemplates that many changes and modifications may be made. For example, the materials from which the various parts and components are selected are dictated by experience in this field, and are not deemed to be particularly critical. The shapes and configurations of the various parts and components are not limited to those shown and described, unless a limitation to that effect expressly appears therein. The front and rear bearings are commercially available, and may be purchased. Similarly, the rear bearing nut is a commercially-available item and may be purchased.

Therefore, while the presently-preferred form of the improved spindle assembly has been shown and described, and several modifications thereof discussed, persons skilled in this art will readily appreciate that various additional changes and modifications may be made without departing from the spirit of the invention as defined and differentiated by the following claims.

What is claimed is:

1. A spindle assembly adapted to be mounted on the rotatable head of a multi-spindle automatic screw machine, said head having a forwardly-facing abutment surface, comprising:

a one-piece outer spindle having a front end, a rear end, and a rearwardly-facing abutment surface adjacent said front end;

a seal member surrounding said outer spindle, said seal member having a front end arranged to bear against said outer spindle abutment surface and having a rear end;

a least one front bearing surrounding said outer spindle, said front bearing having a inner race and an outer race, the front end of said front bearing inner race being arranged to bear against the rear end of said seal member, the rear end of said front bearing outer race being arranged to bear against said head abutment surface, the outer race of said front bearing being arranged to radially engage one portion of said head;

a front bearing retainer nut matingly engaging said head and having a rear end arranged to bear against the front end of said front bearing outer race;

a spacer surrounding an intermediate portion of said outer spindle, said spacer having a front end adapted to bear against the rear end of said front bearing inner race, and having a rear end;

at least one rear bearing surrounding said outer spindle, said rear bearing having an inner race and an outer race, the front end of said rear bearing inner race being arranged to bear against the rear end of said spacer, said outer race of said rear bearing being arranged to radially engage another portion of said head; and a rear bearing retainer nut matingly engaging said outer spindle and arranged to bear against the rear end of said rear bearing.

2. A spindle assembly as set forth in claim 1 wherein said front bearing retainer nut forms with said seal member a tortuous passageway through which fluid may flow from said front bearing to the atmosphere.

3. A spindle assembly as set forth in claim 1 wherein each bearing is adapted to resist axial and rotative loads.

4. A spindle assembly as set forth in claim 1 wherein there are three front bearings.

5. A spindle assembly as set forth in claim 1 wherein there are two rear bearings.

6. A spindle assembly as set forth in claim 1 wherein a first flow of fluid lubricant is supplied to said front bearing, and wherein a majority of such first flow exits said front bearing rearwardly and a minority of such first flow exits said front bearing forwardly.

7. A spindle assembly as set forth in claim 6 wherein about 20% of such first flow exits said front bearing forwardly by passing through said tortuous passageway.

8. A spindle assembly as set forth in claim 6 wherein about 80% of such first flow exits said front bearing rearwardly by passing between said spacer and said head.

9. A spindle assembly as set forth in claim 6 wherein said lubricant is an air/oil mixture.

10. A spindle assembly as set forth in claim 1 wherein a second flow of fluid lubricant is supplied to said rear bearing, and wherein a majority of such second flow exits said rear bearing forwardly and a minority of such second flow exits said rear bearing rearwardly.

11. A spindle assembly as set forth in claim 10 wherein about 20% of such second flow exits said rear bearing rearwardly.

12. A spindle assembly as set forth in claim 10 wherein about 80% of such second flow exits said rear bearing forwardly.

13. A spindle assembly as set forth in claim 10 wherein said lubricant is an air/oil mixture.

14. A spindle assembly as set forth in claim 1 wherein said spindle assembly has a target accuracy of about 0.0003–0.0005 inches.

15. A spindle assembly as set forth in claim 1 wherein a gear assembly surrounds and engages a portion of said spacer.

16. A spindle assembly as set forth in claim 1 wherein said spacer has a front part and a rear part.

17. A spindle assembly as set forth in claim 1 wherein each front bearing is an angular-contact ball bearing.

18. A spindle assembly as set forth in claim 1 wherein each rear bearing is an angular-contact ball bearing.

19. A spindle assembly adapted to be mounted on the rotatable head of a multi-spindle automatic screw machine, said head having a rearwardly-facing abutment surface, comprising:

a one-piece outer spindle having a front end, a rear end, and a rearwardly-facing abutment surface adjacent said front end;

a seal member surrounding said outer spindle, said seal member having a front end arranged to bear against said outer spindle abutment surface and having a rear end;

a least one front bearing surrounding said outer spindle, said front bearing having a inner race and an outer race, the front end of said front bearing inner race being arranged to bear against the rear end of said seal member, the front end of said front bearing outer race being arranged to bear against said head abutment surface, the outer race of said front bearing being arranged to radially engage one portion of said head;

a front bearing retainer nut matingly engaging said head and having a rear end arranged to bear against the front end of said front bearing outer race;

a spacer surrounding an intermediate portion of said outer spindle, said spacer having a front end adapted to bear against the rear end of said front bearing inner race, and having a rear end;

at least one rear bearing surrounding said outer spindle, said rear bearing having an inner race and an outer race, the front end of said rear bearing inner race being arranged to bear against the rear end of said spacer, said outer race of said rear bearing being arranged to radially engage another portion of said head; and a rear bearing retainer nut matingly engaging said outer spindle and arranged to bear against the rear end of said rear bearing.

* * * * *